United States Patent
Chang et al.

(10) Patent No.: US 10,332,234 B2
(45) Date of Patent: *Jun. 25, 2019

(54) MATRIX FACTORIZATION WITH APPROXIMATE COMPUTING

(71) Applicant: International Business Machines Corporation, Armonk, NY (US)

(72) Inventors: Shiyu Chang, Elmsford, NY (US); Liana L. Fong, Irvington, NY (US); Wei Tan, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 15/432,598

(22) Filed: Feb. 14, 2017

(65) Prior Publication Data

US 2018/0232848 A1 Aug. 16, 2018

(51) Int. Cl.
*G06T 1/20* (2006.01)
*G06T 1/60* (2006.01)
*G06F 17/16* (2006.01)

(52) U.S. Cl.
CPC .............. *G06T 1/60* (2013.01); *G06F 17/16* (2013.01); *G06T 1/20* (2013.01)

(58) Field of Classification Search
CPC .................................... G06T 1/20; G06T 1/60
USPC ......................................... 345/501, 530, 541
See application file for complete search history.

(56) References Cited

U.S. PATENT DOCUMENTS

| | | |
|---|---|---|
| 2008/0291122 A1 | 11/2008 | Smith et al. |
| 2014/0121985 A1 | 5/2014 | Sayood et al. |
| 2014/0129500 A1 | 5/2014 | Nice et al. |
| 2016/0012088 A1* | 1/2016 | Rossi ............... G06F 17/30324 707/736 |
| 2016/0371809 A1 | 12/2016 | Cao et al. |
| 2017/0148085 A1* | 5/2017 | Tang .................. G06Q 30/0631 |

OTHER PUBLICATIONS

"Conjugate gradient method," Wikipedia, https://en.wikipedia.org/wiki/Conjugate_gradient_method, last accessed Feb. 10, 2017, 11 pages.
Tan, W., et al., "cuMF_als: GPU-Based Matrix Factorization with Memory Optimization and Approximate Computing," 10 pages.
(Continued)

*Primary Examiner* — Jacinta M Crawford
(74) *Attorney, Agent, or Firm* — Amin, Turocy & Watson, LLP

(57) ABSTRACT

Techniques that facilitate matrix factorization associated with graphics processing units are provided. In one example, a computer-implemented method is provided. The computer-implemented method can comprise loading, by a graphics processing unit operatively coupled to a processor, item features from a data matrix into a shared memory. The data matrix can be a matrix based on one or more user features and item features. The computer-implemented method can further comprise tiling and aggregating, by the graphics processing unit, outer products of the data matrix tiles to generate an aggregate value and approximating, by the graphics processing unit, an update to a user feature of the data matrix based on the aggregate value and the loaded item features.

10 Claims, 14 Drawing Sheets

(56) References Cited

OTHER PUBLICATIONS

Yun, H., et al., "NOMAD: Non-locking, stOchastic multi-machine algorithm for asynchronous and decentralized matrix completion," VLDB, 2014, pp. 975-986, vol. 7, No. 11.
Zhuang, Y., et al., "A fast parallel SGD for matrix factorization in shared memory systems," RecSys '13, Oct. 12-16, 2013, 8 pages.
"IBM Packages for Apache Spark," https://www.ibm.com/developerworks/java/jdk/spark/, last accessed Feb. 10, 2017, 4 pages.
Tan, W., et al., "Faster and Cheaper: Parallelizing Large-Scale Matrix Factorization on GPUs," Mar. 11, 2016, 12, pages.
Non-Final Office Action received for U.S. Appl. No. 15/842,615 dated Jun. 25, 2018, 23 pages.
List of IBM Patents and Applications treated as related.
Final Office Action received for U.S. Appl. No. 15/842,615 dated Nov. 16, 2018, 18 pages.

\* cited by examiner

MATRIX FACTORIZATION WITH APPROXIMATE COMPUTING

BACKGROUND

The subject disclosure relates to matrix factorization systems, and more specifically, to matrix factorization with approximate computing.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate matrix factorization associated with graphics processing units are described.

According to an embodiment, a computer-implemented method is provided. The computer-implemented method can comprise loading, by a graphics processing unit operatively coupled to a processor, item features from a data matrix into a shared memory. The data matrix can be a matrix based on one or more user features and item features. The computer-implemented method can further comprise tiling and aggregating, by the graphics processing unit, outer products of the data matrix tiles to generate an aggregate value and approximating, by the graphics processing unit, an update to a user feature of the data matrix based on the aggregate value and the loaded item features.

According to another embodiment, a computer program product facilitating matrix factorization can comprise a computer readable storage medium having program instructions embodied therewith. The program instructions can be executable by a graphics processing unit operatively coupled to a processor and cause the graphics processing unit to load item features from a data matrix into a shared memory. The data matrix can be a matrix based on one or more user features and item features. The program instructions can further cause the graphics processing unit to tile and aggregate outer products of the data matrix tiles to generate an aggregate value, and approximate an update to a user feature of the data matrix based on the aggregate value and the loaded item features.

According to yet another embodiment, a system is provided. The system can comprise a memory that stores computer executable components, a processor operatively coupled to the memory, and a graphics processing unit operatively coupled to the processor. The graphics processing unit can execute the computer executable components stored in the memory. The computer executable components can comprise an approximate solver component. The approximate solver component can be configured to load item features from a data matrix into a shared memory. The data matrix can be a matrix based on one or more user features and item features. The approximate solver component can also be configured to tile and aggregate outer products of the data matrix tiles to generate an aggregate value and approximate an update to a user feature of the data matrix based on the aggregate value and the loaded item features.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Matrix factorization can be employed by numerous technologies for processing data and/or providing collaborative filtering. For example, machine learning technologies, signal processing technologies, image processing technologies, data analysis technologies and/or other technologies can employ matrix factorization to analyze digital data, process digital data, determine inferences from digital data and/or determine relationships among digital data formatted as a matrix of digital data.

Embodiments described herein include systems, computer-implemented methods, and computer program products that facilitate matrix factorization associated with graphics processing units. For example, a matrix factorization process associated with an alternating least squares algorithm and/or a conjugate solver algorithm can be performed by one or more graphic processing units. Matrix factorization can refer to a technique for analyzing and/or processing digital data formatted as a matrix of digital data for technologies such as, but not limited to, machine learning technologies, collaborative filtering technologies, recommendation system technologies, signal processing technologies, word embedding technologies, topic model technologies, image processing technologies, data analysis technologies and/or other digital technologies. Alternating least squares can refer to an approximation and/or approximate determination of values associated with the digital data based on an alternating least squares approach to matrix factorization.

Figure 1:
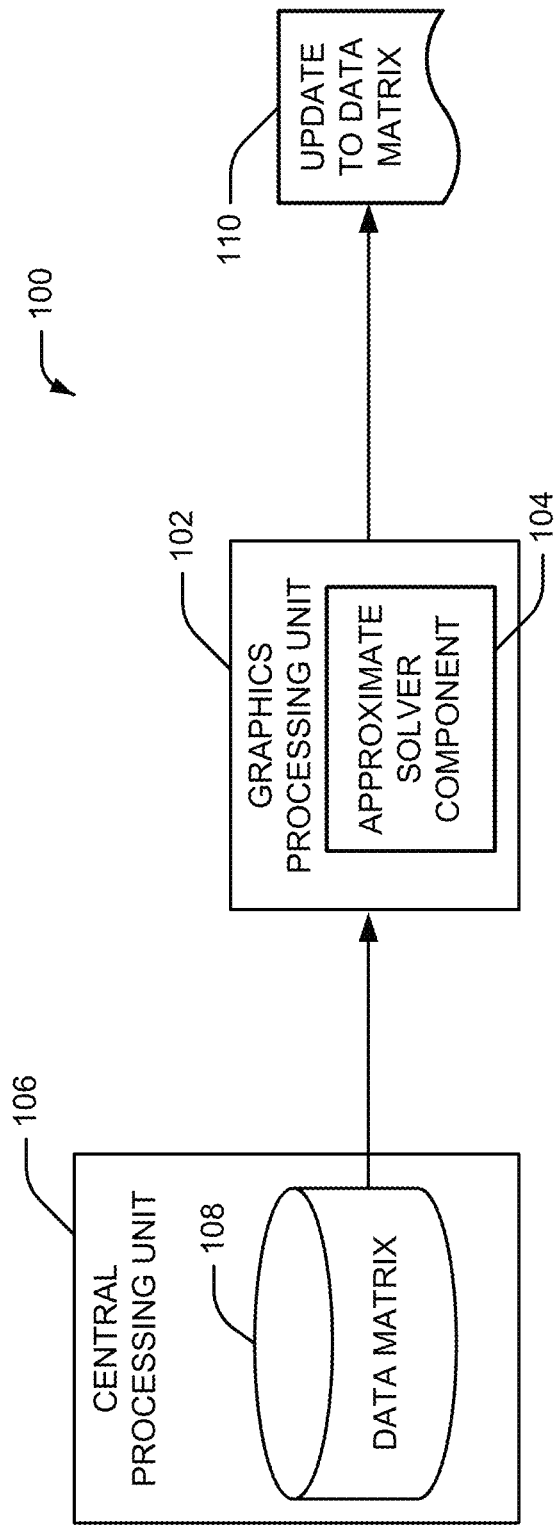
FIG. 1 illustrates a block diagram of an example, non-limiting system to facilitate matrix factorization associated with graphics processing units in accordance with one or more embodiments described herein.

FIG. 1 illustrates a block diagram of an example, non-limiting system 100 that facilitates matrix factorization associated with graphics processing units in accordance with one or more embodiments described herein. In various embodiments, the system 100 can be a matrix factorization system associated with technologies such as, but not limited to, machine learning technologies, collaborative filtering technologies, recommendation system technologies, signal processing technologies, word embedding technologies, topic model technologies, image processing technologies, data analysis technologies and/or other digital technologies.

The system 100 can employ hardware and/or software to solve problems that are highly technical in nature, that are not abstract and that cannot be performed as a set of mental acts by a human. Further, some of the processes performed may be performed by one or more specialized computers (e.g., one or more graphics processing units) for carrying out defined tasks related to matrix factorization. For example, defined tasks related to matrix factorization can comprise transmission of data to one or more graphics processing unit, implementation of one or more algorithmic steps related to an approximate solver component, and determining an update to a data matrix. The system 100 and/or components of the system can be employed to solve new problems (e.g., determining void or missing values in ratings matrices) that arise through advancements in technologies mentioned above, employment of matrix factorization processes, and/or computer architecture, and the like. One or more embodiments of the system 100 can provide technical improvements to matrix factorization systems, machine learning systems, artificial intelligence systems, collaborative filtering systems, recommendation systems, signal processing systems, word embedding systems, topic model systems, image processing systems, data analysis systems and/or other digital systems through rapid matrix factorization utilizing approximate solver components and/or scaling of variables to achieve faster processing times. One or more embodiments of the system 100 can also provide technical improvements to a central processing unit associated with a matrix factorization process by improving processing performance of the central processing unit, reducing computing bottlenecks of the central processing unit, improving processing efficiency of the central processing unit, and/or reducing an amount of time for the central processing unit to perform the matrix factorization process.

In the embodiment shown in FIG. 1, the system 100 can include a graphics processing unit 102. The graphics processing unit 102 can be operatively coupled to the central processing unit 106. The central processing unit 106 can include a data matrix 108 associated with a matrix factorization system. The data matrix 108 can include digital data formatted as a matrix of digital data. The digital data of the data matrix 108 can be generated by and/or provided by a machine learning system, an artificial intelligence system, a collaborative filtering system, a recommendation system, a signal processing system, a word embedding system, a topic model system, an image processing system, a data analysis system, a media content system, a video-streaming service system, an audio-streaming service system, an e-commerce system, a social network system, an internet search system, an online advertisement system, and/or another digital system. In an aspect, the data matrix 108 can be a sparse rating matrix in which at least a portion of information regarding one or more data elements is not included in the data matrix 108. For example, one or more data elements of the data matrix 108 can be void.

In certain embodiments, the graphics processing unit 102 can be a first hardware component and the central processing unit 106 can be a second hardware component. Furthermore, the graphics processing unit can be configured to execute software components such as, for example, an approximate solver component 104. The graphics processing unit 102 can be communicatively coupled to the central processing unit 106 via a shared memory bus. For example, in certain implementations, the graphics processing unit 102 can access the data matrix 108 and/or receive a portion of the data matrix 108 via a corresponding communication bus.

The central processing unit 106 can transmit one or more data blocks or portions of the data matrix 108 to the graphics processing unit 102. The one or more data blocks can be received and/or processed by the graphics processing unit 102. The one or more data blocks can include a set of data elements. For instance, the set of data elements of the one or more data blocks can include one or more data elements associated with numerical data (e.g., one or more data elements with a numerical value) and/or one or more data elements associated with void data (e.g., one or more data elements without a numerical value).

The graphics processing unit 102 can analyze and/or process the one or more data blocks of the data matrix 108 to generate an update 110 to the data matrix 108 for the matrix factorization system associated with the data matrix 108. For example, the update 110 can be a set of resultant information generated as a result of analyzing and/or processing of the one or more data blocks by the graphics processing unit 102. The update 110 can be learned and/or inferred based on the set of data elements included in the one or more data blocks. Detailed discussion regarding the processing to generate the update 110 is described in detail below.

Figure 2:
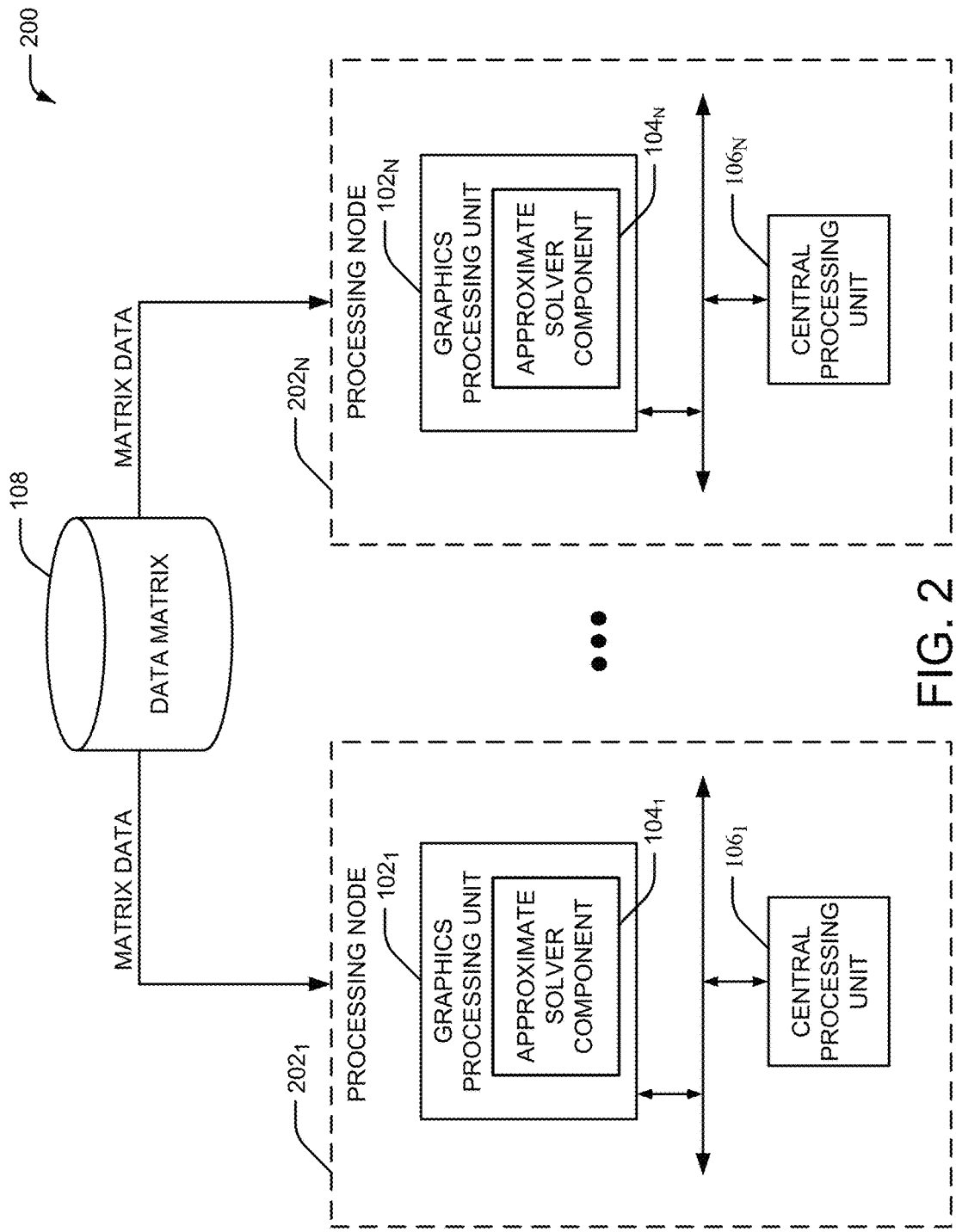
FIG. 2 illustrates a block diagram of another example, non-limiting system to facilitate matrix factorization associated with graphics processing units in accordance with one or more embodiments described herein.

FIG. 2 illustrates another block diagram of an example, non-limiting system 200 in accordance with one or more embodiments described herein. Repetitive description of like elements employed in other embodiments described herein is omitted for sake of brevity.

The system 200 can include the data matrix 108, a processing node $202_1$ and a processing node $202_N$, in which N is an integer greater than or equal to 2. The processing node $202_1$ can be a first computer node and the processing node $202_N$ can be a Nth processing node. As such, the system 200 can include multiple computer nodes with multiple graphic processing units and/or multiple central processing units. In the embodiment shown in FIG. 2, the processing node $202_1$ can include a graphics processing unit $102_1$ and a central processing unit $106_1$. Additionally, the processing node $202_N$ can include a graphics processing unit $102_N$ and a central processing unit $106_N$. The graphics processing unit $102_1$ and/or the graphics processing unit $102_N$ can correspond to, for example, the graphics processing unit 102. The central processing unit $106_1$ and/or the central processing unit $106_N$ can correspond to, for example, the central processing unit 106. Accordingly, the system 200 can be implemented as two or more levels of processing with respect to a matrix factorization process. In an embodiment, the central processing unit $106_1$ can include the data matrix 108. In another embodiment, the central processing unit $106_N$ can include the data matrix 108. In yet another embodiment, the central processing unit $106_1$ can include a portion of the data matrix 108 and the central processing unit $106_N$ can include another portion of the data matrix 108. In yet another embodiment, another central processing unit can include the data matrix 108 or a portion of the data matrix 108.

The system 200 can provide improved performance for the matrix factorization process. In an aspect, one or more data blocks (e.g., MATRIX DATA shown in FIG. 2) of the data matrix 108 can be provided to the processing node $202_1$. Furthermore, one or more other data blocks (e.g., MATRIX DATA shown in FIG. 2) of the data matrix 108 can be provided to the processing node $202_N$. The graphics processing unit $102_1$ of the processing node $202_1$ can process the one or more data blocks. Information generated by the graphics processing unit $102_1$ in response to the one or more data blocks can be transmitted to the central processing unit $106_1$. The central processing unit $106_1$ can process and/or generate at least a portion of the update 110 based on the information generated by the graphics processing unit $102_1$. Similarly, graphics processing unit $102_N$ of the processing node $202_N$ can process the one or more other data blocks. Information generated by the graphics processing unit $102_N$ in response to the one or more other data blocks can be transmitted to the central processing unit $106_N$. The central processing unit $106_N$ can process and/or generate at least a portion of the update 110 based on the information generated by the graphics processing unit $102_N$. In an embodiment, the central processing unit $106_1$ can process and/or generate a first portion of the update 110 and the central processing unit $106_N$ can process and/or generate a second portion of the update 110.

Figure 3:
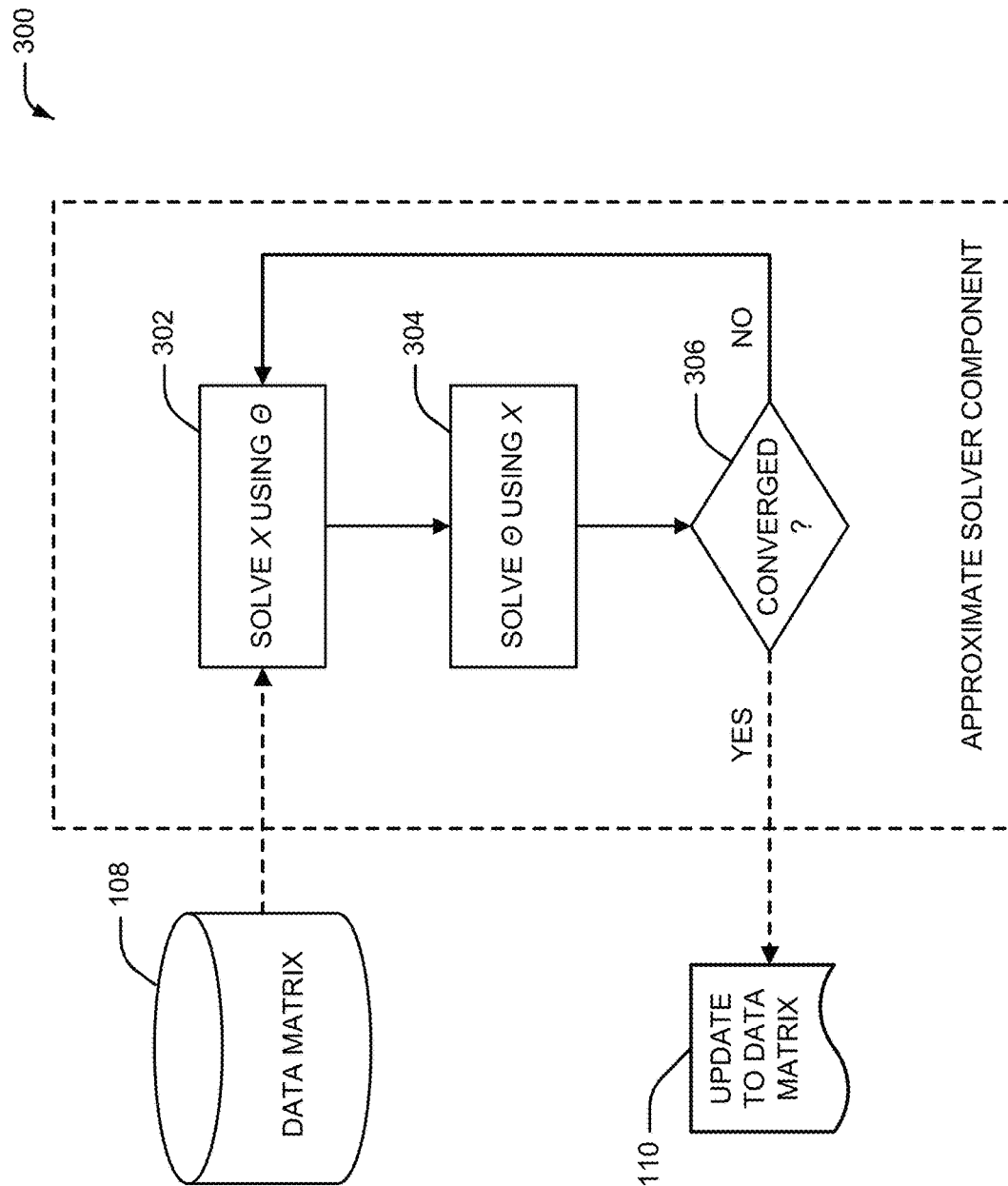
FIG. 3 illustrates a block diagram of an example, non-limiting approximate solver component to facilitate matrix factorization associated with graphics processing units in accordance with one or more embodiments described herein.

FIG. 3 illustrates a block diagram of an example, non-limiting approximate solver component 300 to facilitate matrix factorization associated with graphics processing units in accordance with one or more embodiments described herein. Repetitive description of like elements employed in other embodiments described herein is omitted for sake of brevity.

As illustrated in FIG. 3 the approximate solver component 300 can receive matrix data from data matrix 108. Responsive to receiving the matrix data, the approximate solver component 300 can solve for a first entity associated with the data matrix 108 as shown in block 302. Responsive to solving for the first entity associated with the data matrix 108, the approximate solver component 300 can solve for a second entity associated with the data matrix 108, as shown in block 304. Furthermore, according to at least one embodiment, the approximate solver component 300 can be substantially similar to the approximate solver component 104 illustrated in FIG. 1 and FIG. 2.

Upon achieving a converged solution to the first and second entities associated with the data matrix 108 as shown at block 306, the approximate solver component 300 can further output at least a portion of the update 110 to the data matrix 108. For example, and without limitation, the update 110 can be further processed by a graphics processing unit and/or central processing unit as a solution to a matrix factorization process. Hereinafter, a more detailed discussion of a matrix factorization process is provided with reference to different forms of data matrices.

Figure 4:
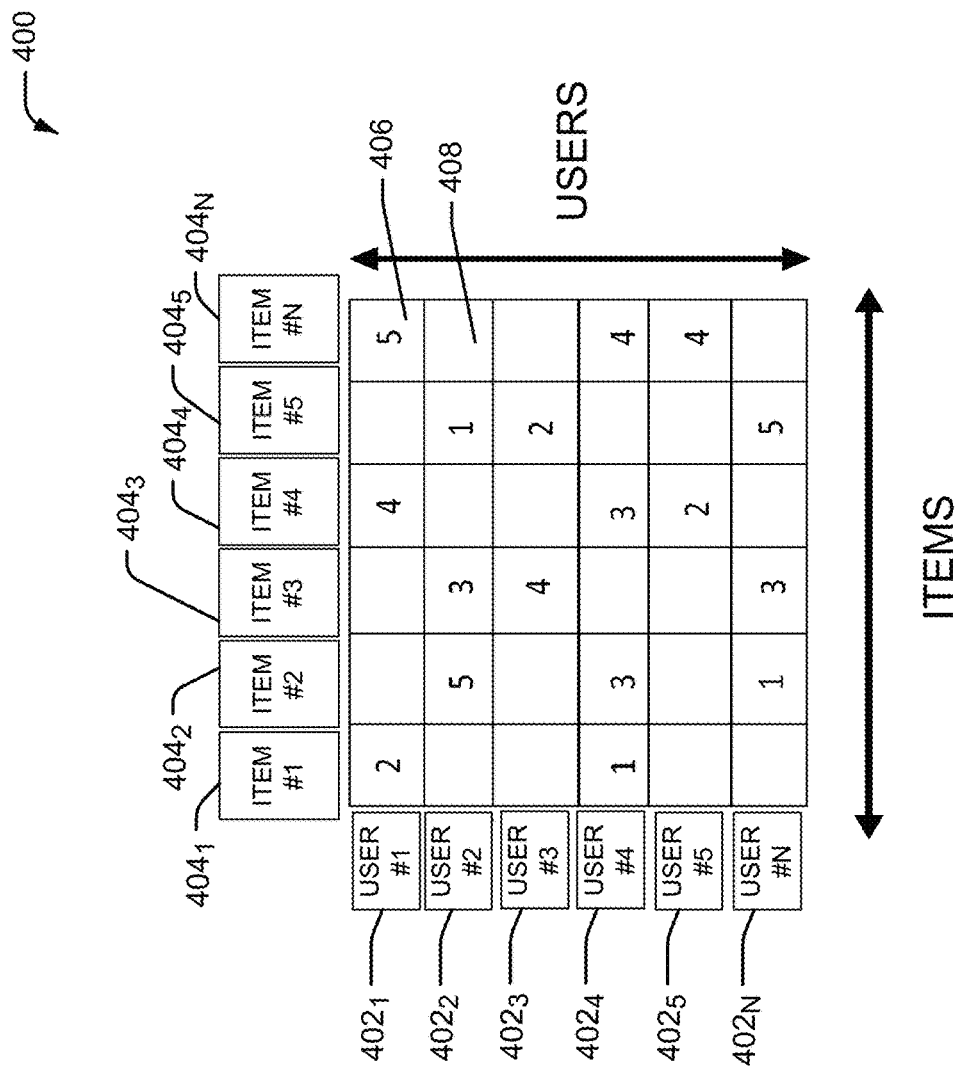
FIG. 4 illustrates an example, non-limiting data matrix associated with matrix factorization in accordance with one or more embodiments described herein.

FIG. 4 illustrates another block diagram of an example, non-limiting data matrix 400 associated with matrix factorization in accordance with one or more embodiments described herein. Repetitive description of like elements employed in other embodiments described herein is omitted for sake of brevity.

The data matrix 400 can, for example, correspond to the data matrix 108. The data matrix 400 can provide matrix factorization for a recommendation system. The data matrix 400 can also be employed during a cognitive computing process associated with an artificial intelligence learning system. The data matrix 400 can include data associated with a set of users $402_{1-N}$ and a set of items $404_{1-N}$. For example, the set of users $402_{1-N}$ can correspond to a set of user identities in a recommendation system. Furthermore, the set of items $404_{1-N}$ can be a set of items that are rated by the set of users $402_{1-N}$. The set of items $404_{1-N}$ can include, but is not limited to, a set of movies, a set of songs, a set of books, a set of products, a set of restaurants, a set of internet search queries, a set of social tags, a set of items for purchase, a set of services, a set of other items, etc. In an example, a data block 406 of the data matrix 400 can correspond to a rating for an item $404_N$ by a user $402_1$. For instance, the user $402_1$ can rate the item $404_N$ with a rating "5". In another example, a data block 408 of the data matrix 400 can correspond to an item $404_N$ that is not rated by a user $402_2$. For instance, the data block 408 can be void since the user $402_2$ did not provide a rating for the item $404_N$.

In an aspect, the data matrix 400 can be input data provided to the graphics processing unit 102. For example, the graphics processing unit 102 can process a portion of the data matrix 400. In another aspect, the graphics processing unit 102 can process the portion of the data matrix 400 to facilitate determination of missing data in the data matrix 400. For example, the graphics processing unit 102 can process one or more data blocks of the data matrix 400 to facilitate determination of a rating of the data block 408 of the data matrix 400.

The data matrix 400 can correspond to a rating matrix R. The graphics processing unit 102 and/or the central processing unit 106 can factorize the rating matrix R into $R \approx X \cdot \theta^T$, in which X can correspond to a low rank matrix associated with the set of users $402_{1-N}$ and $\theta^T$ can correspond to a low rank matrix associated with the set of set of items $404_{1-N}$. The graphics processing unit 102 and/or the central processing unit 106 can collaboratively process the data matrix 400 (e.g., the rating matrix R) to, for example, minimize error with respect to missing data of the data matrix 400 (e.g., minimize error over observed ratings). For example, the graphics processing unit 102 and/or the central processing unit 106 can collaboratively process the data matrix 400 to minimize error of a cost function J associated with machine learning. The cost function J can be equal to, for example:

$$J = \sum_{r_{uv} \neq 0} (r_{uv} - x_u^T \theta_v)^2 + \lambda \left( \sum_u n x_u \| x_u \|^2 + \sum_v n \theta_v \| \theta_v \|^2 \right) \quad \text{(Equation 1)}$$

in which $r_{uv}$ is a value of the rating matrix R at a position (u,v), $x_u$ is a uth row for the low rank matrix X, $\theta_v$ is a with column for the low rank matrix $\theta^T$, and $\lambda$ is a regularization parameter associated with the cost function J.

The graphics processing unit 102 and/or the central processing unit 106 can collaboratively process the data matrix 400 during an alternating least squares process associated with the cost function J. According to the alternating least squares process, the systems and processes described herein can first optimize X while fixing $\theta$, and subsequently optimize $\theta$ while fixing X. Alternatively, according to the alternating least squares process, the systems and processes described herein can first optimize $\theta$ while fixing X, and subsequently optimize X while fixing $\theta$. When fixing $\theta$, X can be optimized by $$\frac{dJ}{dx_u} = 0$$

which leads to the following Equation 2:

$$\sum_{r_{uv} \neq 0} (\theta_v \theta_v^T + \lambda I) \bullet x_u = \theta^T \bullet R_u^T \quad \text{(Equation 2)}$$

Next, with X from Equation 2, $\theta$ can be generated in a similar manner as shown in Equation 3:

$$\sum_{r_{uv} \neq 0} (x_u x_u^T + \lambda I) \cdot \theta_v = X^T \cdot R_v \quad \text{(Equation 3)}$$

Accordingly, an alternating least squares process as described herein can update X using Equation 2, and can update $\theta$ using Equation 3, in an alternating manner, and in multiple iterations. Furthermore, Equation 2 and Equation 3 show that, the updates of each (or, in some embodiments, one or more) $x_u$ and $\theta_v$ can be independent of each other.

Figure 5:
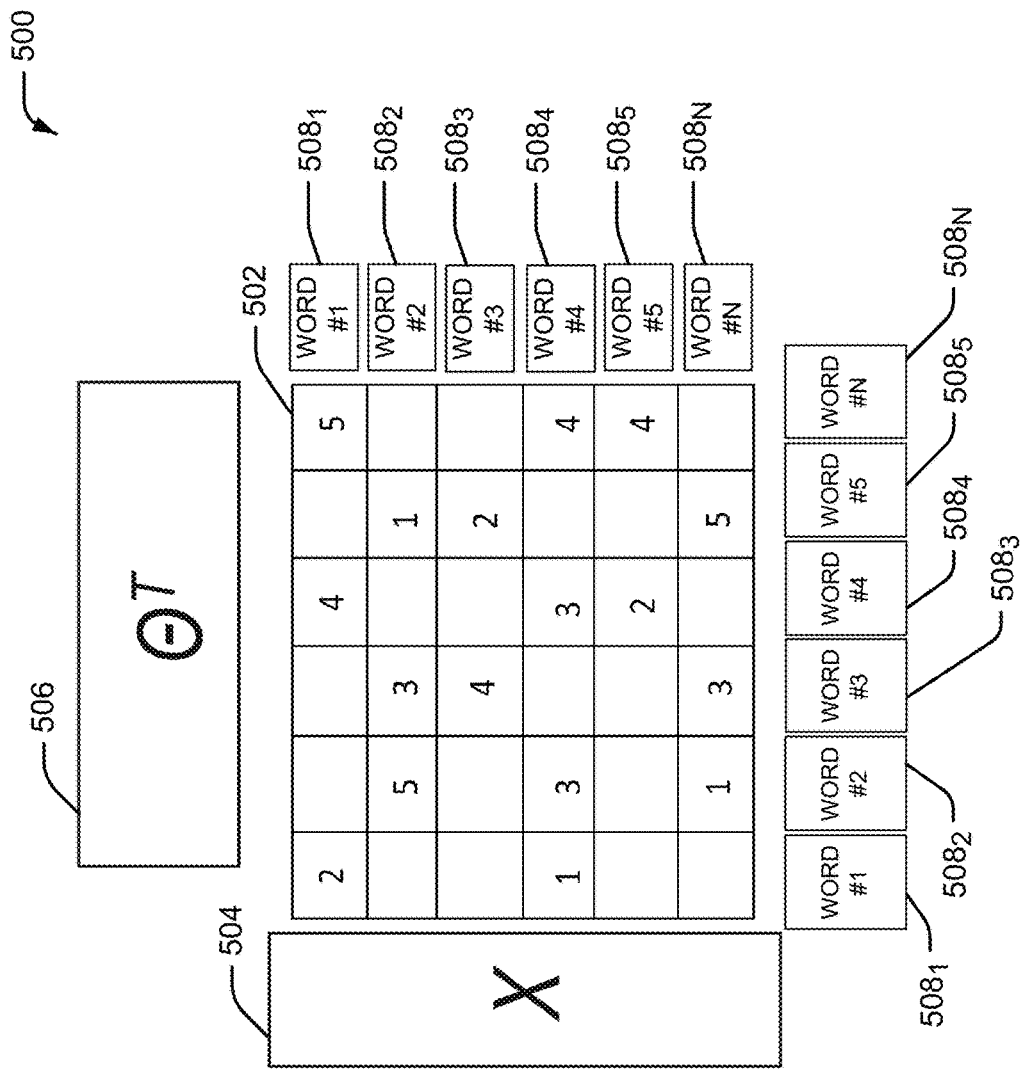
FIG. 5 illustrates another example, non-limiting data matrix associated with matrix factorization in accordance with one or more embodiments described herein.

FIG. 5 illustrates another block diagram of an example, non-limiting system 500 associated with matrix factorization in accordance with one or more embodiments described herein. Repetitive description of like elements employed in other embodiments described herein is omitted for sake of brevity.

The system 500 can include a data matrix 502, a data matrix 504, and a data matrix 506. The data matrix 502 can, for example, correspond to the data matrix 108. The system 500 can be associated with a word embedding system for natural language processing. For example, the data matrix 502 can provide matrix factorization for a word embedding system. The data matrix 502 can also be employed during a cognitive computing process associated with an artificial intelligence learning system. The data matrix 502 can include data associated with a set of words $508_{1-N}$. The set of words $508_{1-N}$ can be a set of parameterized functions that maps a representation of one or more words in a particular language to a set of numerical vectors.

In an aspect, the data matrix 502 can be input data provided to the graphics processing unit 102. For example, the graphics processing unit 102 can process a portion of the data matrix 502. In another aspect, the graphics processing unit 102 can process the portion of the data matrix 502 to facilitate determination of missing data in the data matrix 502. The data matrix 502 can correspond to a rating matrix R. The graphics processing unit 102 and/or the central processing unit 106 can factorize the data matrix 502 into the data matrix 504 and the data matrix 506. For example, the data matrix 504 can be a low rank matrix X associated with the set of words $508_{1-N}$. Furthermore, the data matrix 506 can be a low rank matrix $\theta^T$ that is also associated with the set of words $508_{1-N}$.

Figure 6:
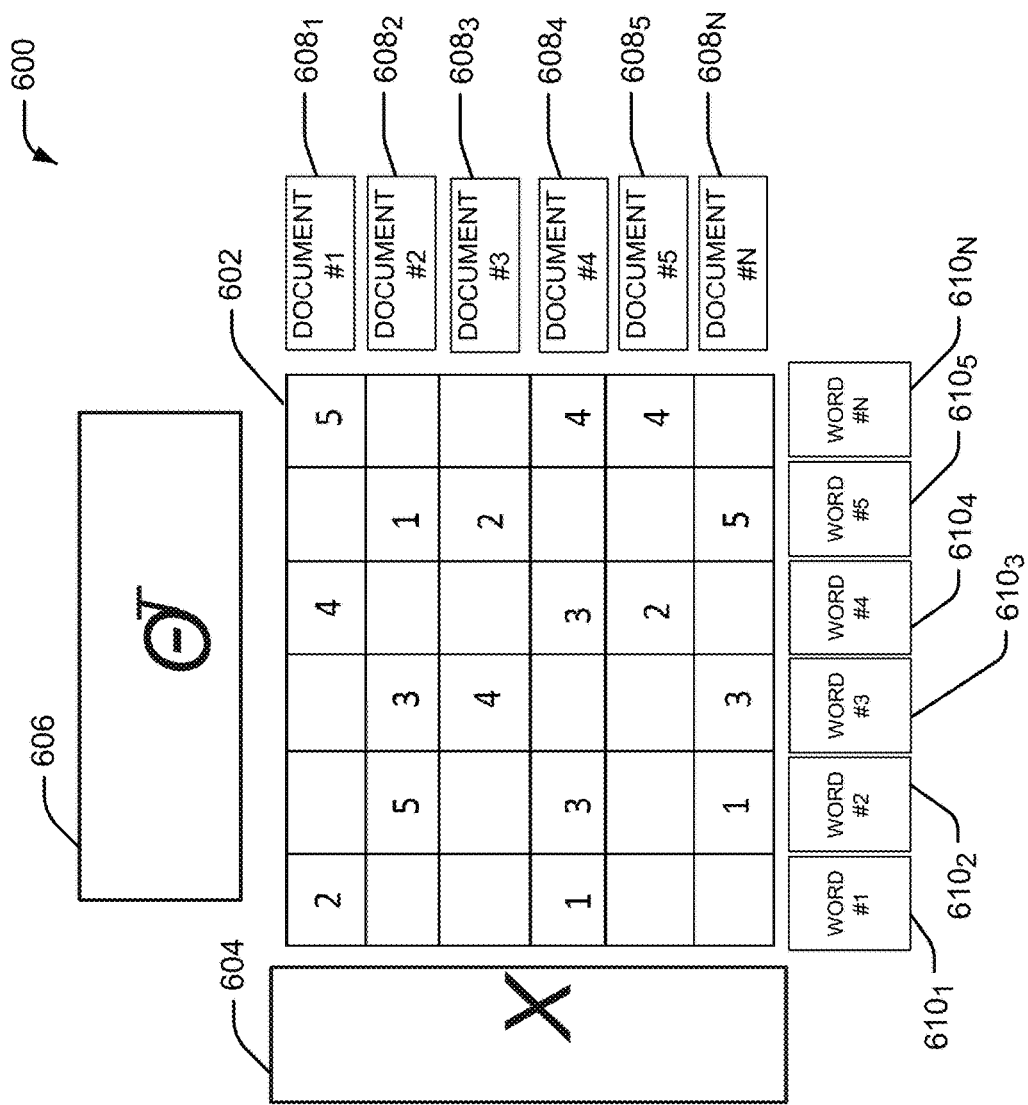
FIG. 6 illustrates another example, non-limiting data matrix associated with matrix factorization in accordance with one or more embodiments described herein.

FIG. 6 illustrates another block diagram of an example, non-limiting system 600 associated with matrix factorization in accordance with one or more embodiments described herein. Repetitive description of like elements employed in other embodiments described herein is omitted for sake of brevity.

The system 600 can include a data matrix 602, a data matrix 604, and a data matrix 606. The data matrix 602 can, for example, correspond to the data matrix 108. The system 600 can be associated with a topic model system for identifying discovering a topic that occurs in a collection of documents during a machine learning process. For example, the data matrix 602 can provide matrix factorization for a topic model system. The data matrix 602 can also be employed during a cognitive computing process associated with an artificial intelligence learning system. The data matrix 602 can include data associated with a set of documents $608_{1-N}$ and a set of words $610_{1-N}$. The set of documents $608_{1-N}$ can be a set of parameterized functions that map a representation of content included in the set of set of documents $608_{1-N}$ into a set of numerical vectors. Furthermore, the set of words $510_{1-N}$ can be a set of parameterized function that maps a representation of one or more words in a particular language to a set of numerical vectors. The set of words $610_{1-N}$ can facilitate detection of one or more topics included in the set of documents $608_{1-N}$. In an aspect, the data matrix 602 can be input data provided to the graphics processing unit 102. For example, the graphics processing unit 102 can process a portion of the data matrix 602. In another aspect, the graphics processing unit 102 can process the portion of the data matrix 602 to facilitate determination of missing data in the data matrix 602. The data matrix 602 can correspond to a rating matrix R. The graphics processing unit 102 and/or the central processing unit 106 can factorize the data matrix 602 into the data matrix 604 and the data matrix 606. For example, the data matrix 604 can be a low rank matrix X associated with the set of documents $608_{1-N}$. Furthermore, the data matrix 606 can be a low rank matrix $\theta^T$ associated with the set of words $610_{1-N}$.

Figure 7A:
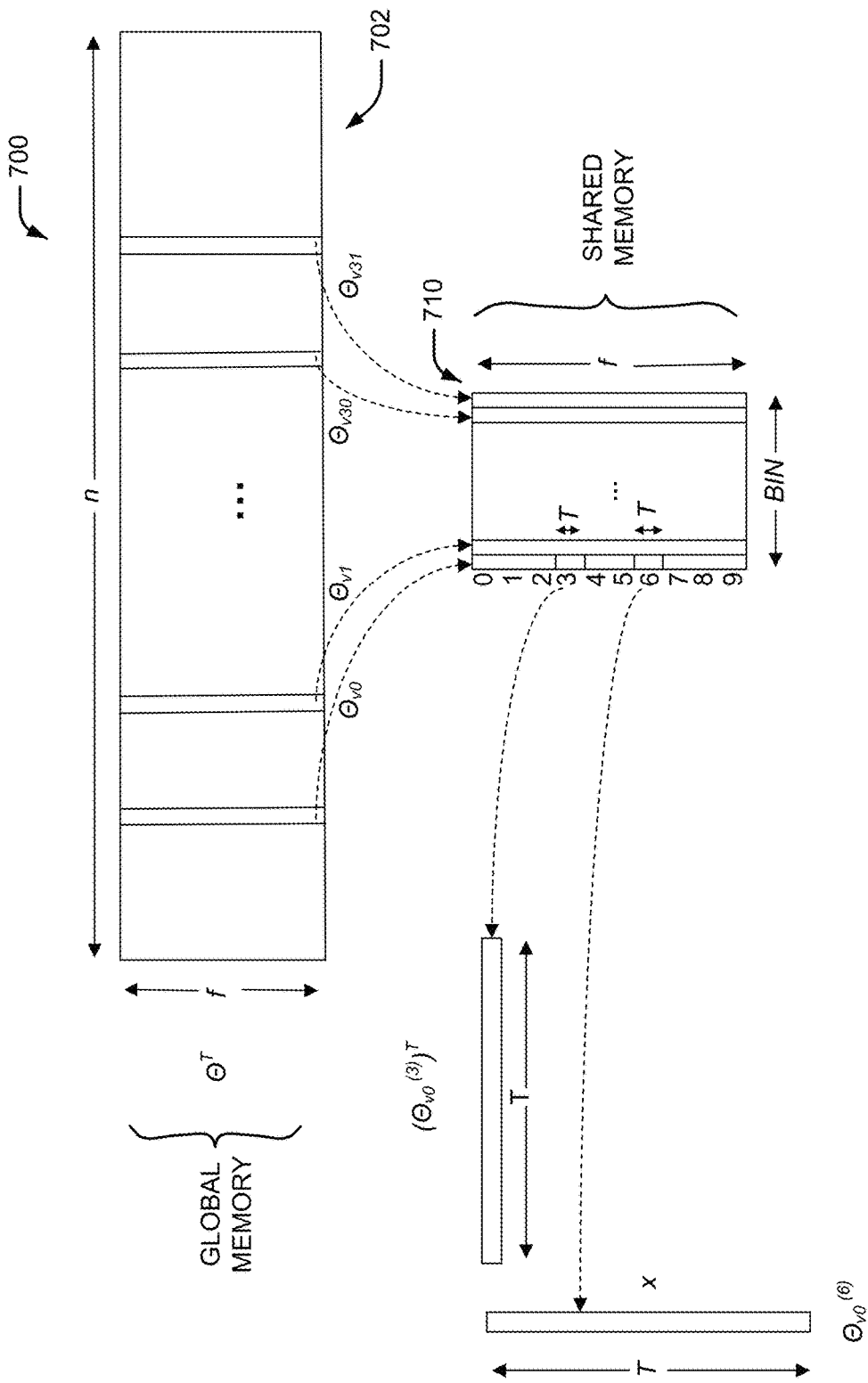
FIGS. 7A and 7B illustrate example, non-limiting data matrices associated with matrix factorization in accordance with one or more embodiments described herein.
Figure 7B:
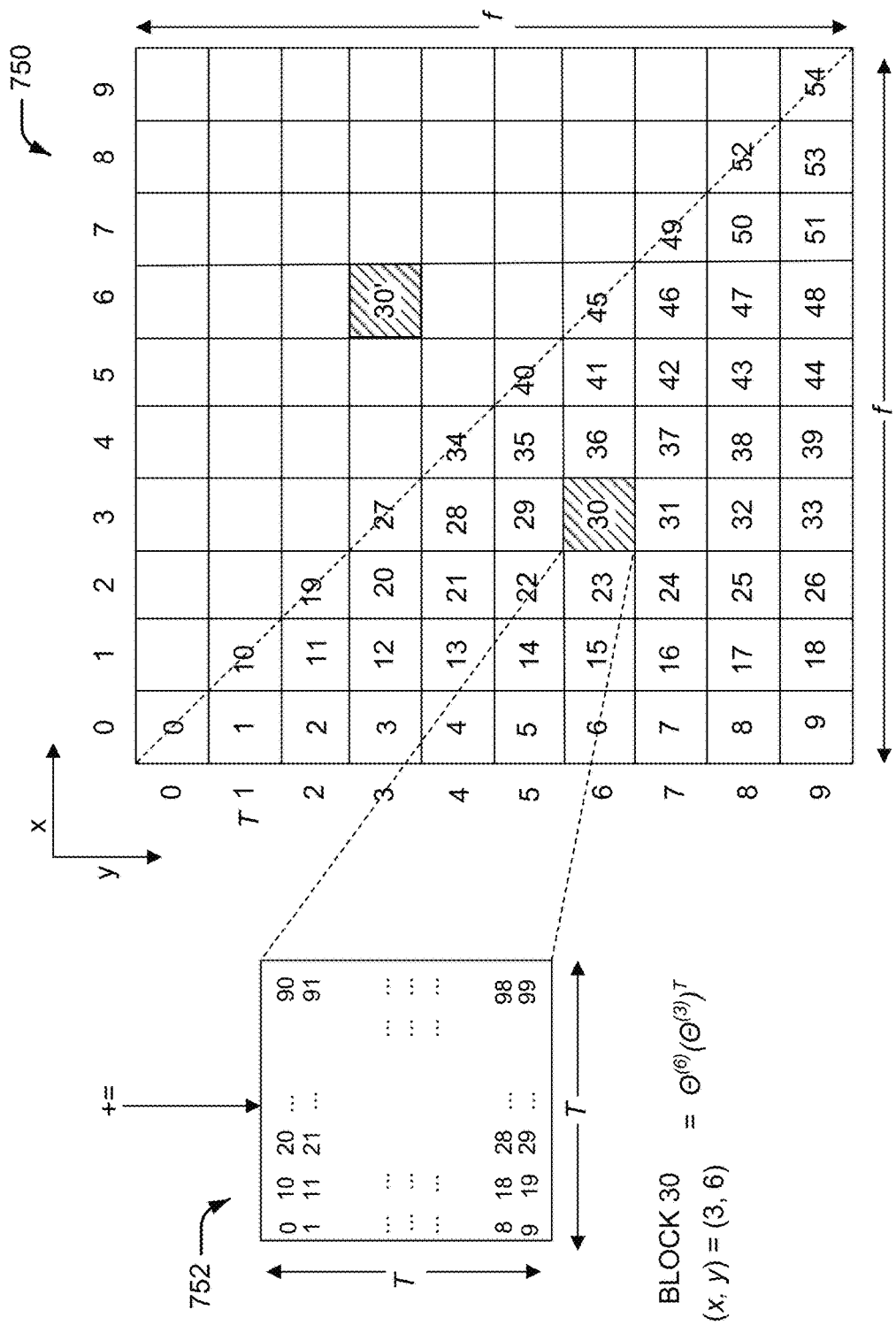

FIGS. 7A and 7B illustrate another block diagram of an example, non-limiting system 700 associated with matrix factorization in accordance with one or more embodiments described herein. Repetitive description of like elements employed in other embodiments described herein is omitted for sake of brevity.

The system 700 can include data matrix 702, data matrix 710, data matrix 750, and matrix tile 752. The data matrix 702 can, for example, correspond to any of the low rank data matrices $\theta^T$ described above. The data matrix 702 can be stored in global memory associated with the central processing unit 106 and/or graphics processing unit 102. As shown in FIG. 7A, the data matrix 702 can include individual columns $\theta_v$ associated with the data matrix 108. Each individual column (or, in some embodiments, one or more columns) can be assembled into individual matrix tiles 752 within shared memory. Furthermore, as shown in FIG. 7B, individual tiles 752 can be assembled into matrix 750 stored in a memory register.

For example, for a given user feature X, associated features can be staged into a shared memory space in batches of size BIN. For each staged feature value $\theta_v$ (or, in some embodiments, one or more feature values), $\theta_v/(\theta_v)^T$ can be calculated by tiling of size T. Tiles in the result can be the outer product of two tiles in $\theta_v$. Considering the symmetricity, only tiles with (x)/(leq y) (e.g., of x less than or equal to y) are calculated. Results of $\theta_v/(\theta_v)^T$ can then be aggregated and temporarily stored in a register. The data stored in the register can subsequently be flushed to global memory when all required $\theta_v$ are calculated. Further description of the tiling and aggregation process are provided below.

For a given $x_u$, its required features, i.e., $\theta_v$'s such that $r_{uv}$ does not equal 0, can be staged from $\Theta^T$ from the global memory (e.g., the matrix 702) into a shared memory space of size BIN*f (e.g., the smaller matrix 710), in batches. For each staged feature $\theta_v$ (or, in some embodiments, one or more staged features), $\theta_v \theta_v^T$ can be calculated in tiles of size T. Thereafter, $\theta_v \theta_v^T$ can be added to the corresponding sub-block of $A_u$ in registers (e.g., the symmetric matrix 750 of FIG. 7B). Each sub-block in $A_u$ (or, in some embodiments, one or more sub-blocks) can aggregate the outer product of two tiles in $\theta_v$. Considering this symmetricity, in at least one embodiment, only tiles with coordinates x≤y can be calculated. The content of $A_u$ stored in memory registers can be flushed to global memory when all required $\theta_v$ is calculated.

Figure 8:
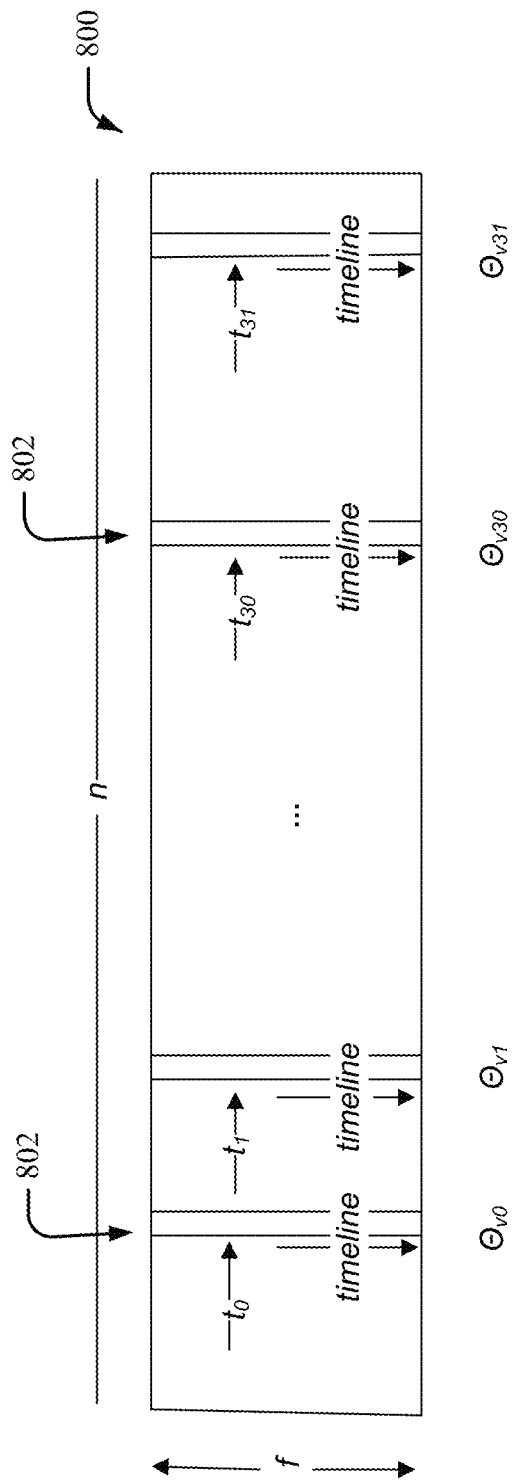
FIG. 8 illustrates an example non-limiting thread arrangement associated with matrix factorization in accordance with one or more embodiments described herein.

FIG. 8 illustrates an example non-limiting thread arrangement 800 associated with matrix factorization in accordance with one or more embodiments described herein. Repetitive description of like elements employed in other embodiments described herein is omitted for sake of brevity.

As shown in FIG. 8, individual threads 802 can read individual columns $\theta_v$. Thus, in low-occupancy, an entire column $\theta_v$ can be cached and subsequent read operations will be cached. Accordingly, as used herein, non-coalesced memory operations refer to operations where individual threads can read individual columns $\theta_v$ in a matrix factorization process.

Figure 9:
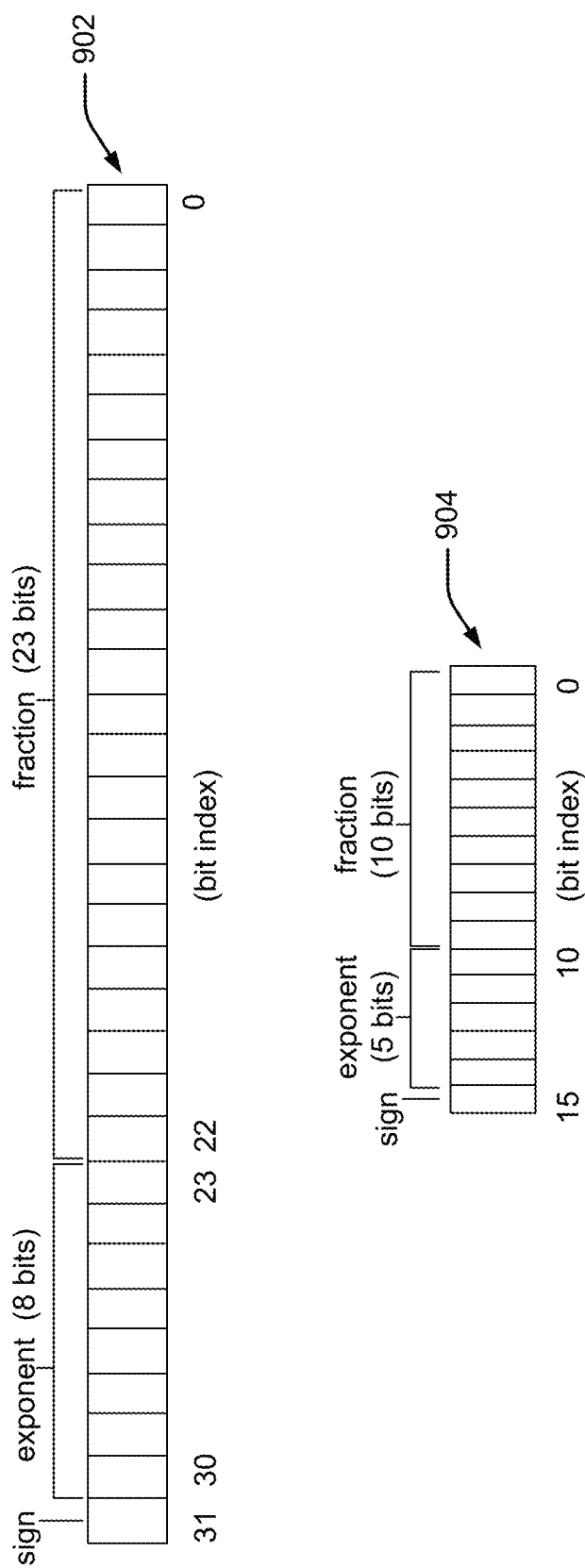
FIG. 9 illustrates example, non-limiting reduced precision sets for matrix factorization in accordance with one or more embodiments described herein.

FIG. 9 illustrates example, non-limiting reduced precision sets for matrix factorization in accordance with one or more embodiments described herein. Repetitive description of like elements employed in other embodiments described herein is omitted for sake of brevity.

As shown in FIG. 9, a 32-bit precision floating point can comprise a sign bit, an exponent set of 8 bits, and a fraction set of 23 bits. However, according to some embodiments, a 16-bit reduced precision floating point value 904 can be used for individual values of a data matrix. A 16-bit reduced precision floating point can comprise a sign bit, an exponent set of 5 bits, and a fraction set of 10 bits.

Figure 10:
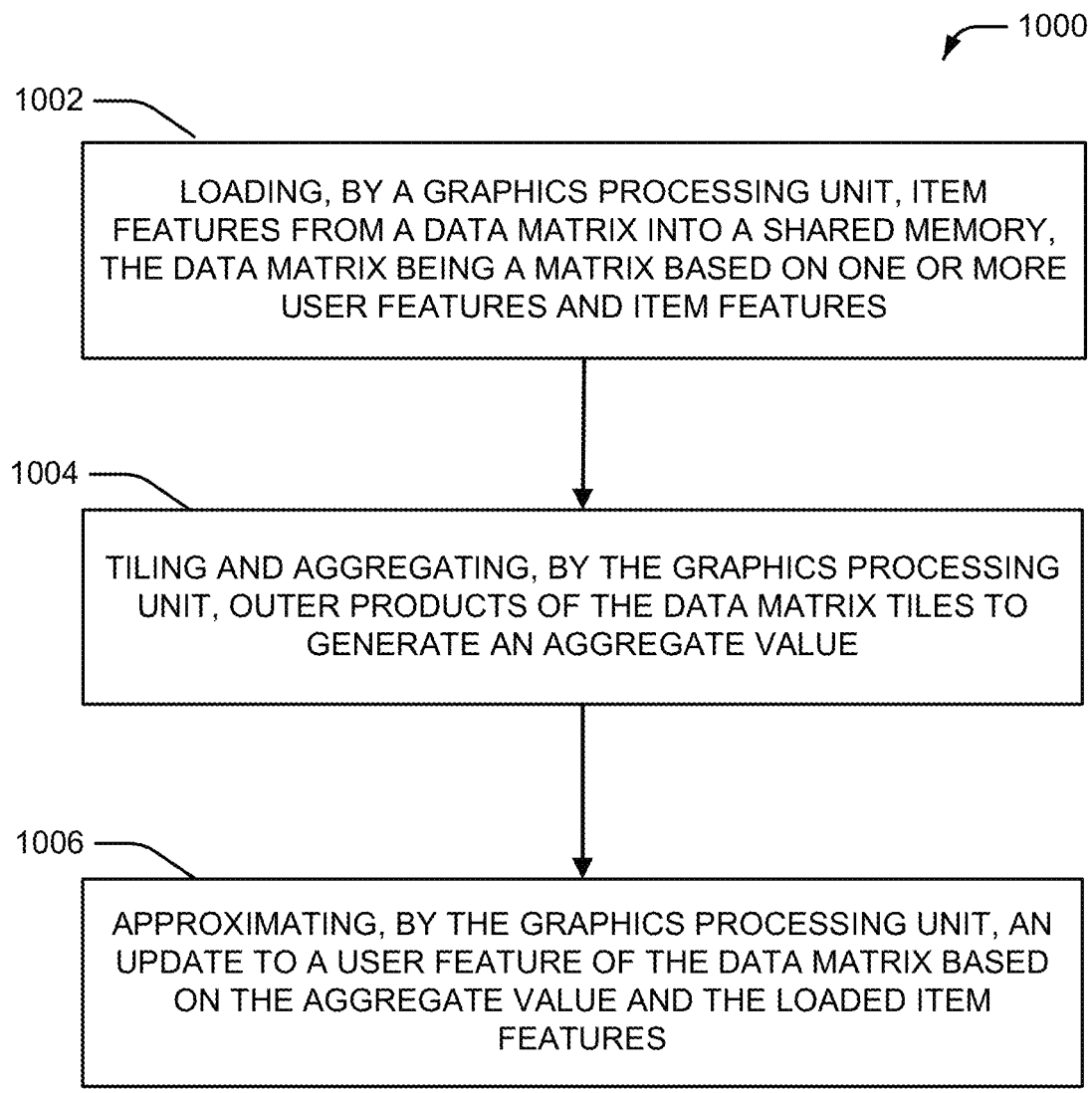
FIG. 10 illustrates a flow diagram of an example, non-limiting computer-implemented method for performing a matrix factorization process in accordance with one or more embodiments described herein.

FIG. 10 illustrates a flow diagram of an example, non-limiting computer-implemented method 1000 for performing a matrix factorization process in accordance with one or more embodiments described herein. The computer-implemented method 1000 can comprise block 1002, block 1004, and block 1006. Repetitive description of like elements employed in other embodiments described herein is omitted for sake of brevity.

The computer-implemented method 1000 can comprise loading, by a graphics processing unit, item features from a data matrix into a shared memory at block 1002 (e.g., via graphics processing unit 102). Furthermore, the data matrix can be data matrix 108. Additionally, the data matrix can be a matrix based on one or more user features and item features. As discussed in detail above, user features and item features can be processed in an alternating fashion according to the algorithm 1 provided above.

Generally, the loading the item features can comprise loading an item feature of the data matrix via a cache into a shared portion of memory separate from other item features of the data matrix. For example, and as shown in FIG. 7A, item features can comprise individual columns of the data matrix 108.

The computer-implemented method 1000 can further comprise tiling and aggregating, by the graphics processing unit, outer products of the data matrix tiles to generate an aggregate value at block 1004 (e.g., via graphics processing unit 102). Furthermore, the tiling and aggregating can be performed similarly to the process outlined above with reference to FIGS. 7A and 7B.

The computer-implemented method 1000 can further comprise approximating, by the graphics processing unit, an update to a user feature of the data matrix based on the aggregate value and the loaded item features at block 1006 (e.g., via graphics processing unit 102). Furthermore, the update can be update 110.

The approximating can be facilitated by the approximate solver component 104 illustrated in FIGS. 1 and 2. For example, an appropriate approximate solver can be based on an algorithmic approach to approximate the update 110. One example approximate solver is provided below with reference to Algorithm 1:

---
Algorithm 1 The CG Solver.
---
```
 1: procedure CGSOLVE(A, x, b, f_s, ε)
 2:     r = b − A · x
 3:     p = r
 4:     rs_old = r^T · r
 5:     for j = 1 : f_s do
 6:         α_p = A · p
 7:         α = rs_old/(p^T · α_p)
 8:         x = x + αp
 9:         r = r − αp
10:         rs_new = r^T · r
11:         if √rs_new < ε then
12:             break
13:         end if
14:         p = r + (rs_new/rs_old)p
15:         rs_old = rs_new
16:     end for
17:     return x
18: end procedure
```
---

In Algorithm 1, A is the aggregated outer product of item features, that is, the left-hand side matrix in Equation 2; b is the right-hand side of Equation 2; ε is a small number (e.g., 0.00001) to stop the iterations; r, p, α, $\alpha_p$, $rs_{old}$, $rs_{new}$ are intermidiate data generated during the process. As shown in Algorithm 1, an approximate updated user feature x (e.g., roughly equivalent to a portion of the update 110), is facilitated through far fewer iterations as compared to an exact conjugate gradient approach. For example, a number of iterations $f_s$ can be chosen to be at least one order of magnitude less than f (e.g., illustrated in FIG. 7A).

In at least one embodiment, the computer-implemented method 1000 can further comprise scaling, by the graphics processing unit, a reduced precision set of variables associated with the data matrix into associated matrix tiles (e.g., via graphics processing unit 102). Furthermore, the scaling can be based on the example provided above with reference to FIG. 9.

For example, the reduced precision set can comprise storage reduced by fifty percent as compared to full precision (e.g., 32-bit floating point precision). In this example, the reduced precision set can comprise precision reduced from 32-bit precision to 16-bit precision, as detailed above.

Furthermore, according to one embodiment, the scaling the reduced precision set of variables can also comprise normalizing the reduced precision set of variables. Generally, normalizing the reduced precision set of the variables can comprise normalizing such that a variable is determined as a function of a mean value and a standard deviation value. Thus, the scaling can comprise determining a variable as a function of a mean value and a standard deviation value. For example, and without limitation, the normalizing can comprise dividing the mean value by the standard deviation value. Other forms of normalizing may also be applicable.

Furthermore, according to at least one embodiment, the update 110 can utilize an approximate solver which is of lower complexity and same convergence quality as an exact solver (e.g., approximate solver component 104). For example, the approximating the update can comprise approximating the update employing an approximate solver that is of lower complexity than and with a convergence time less than or equal to the convergence time of an exact solver. An exact solver can be a solver configured to converge based on the full number of iterations f, as compared to $f_s$ outlined in Algorithm 1, above.

Figure 11:
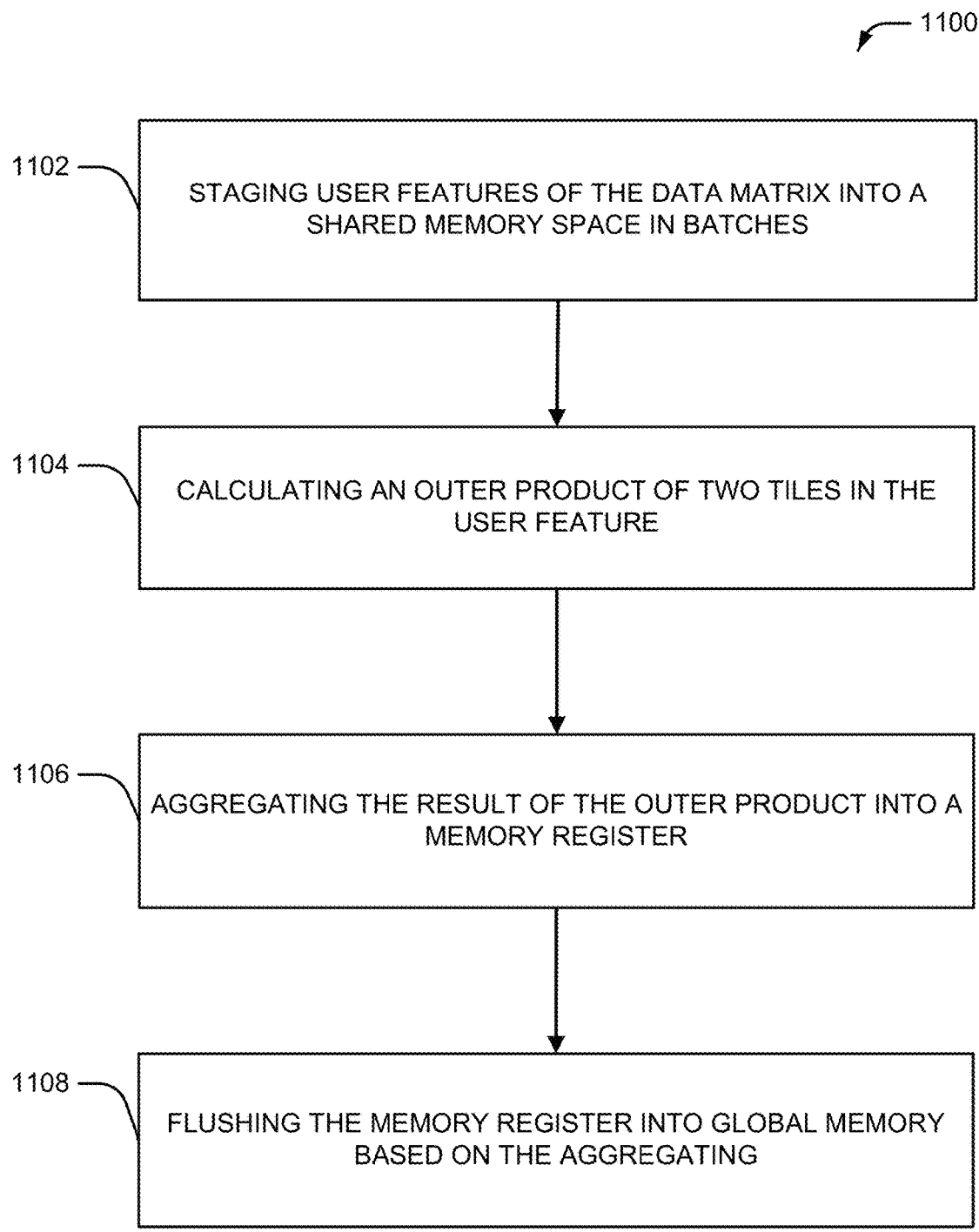
FIG. 11 illustrates a flow diagram of another example, non-limiting computer-implemented method for performing a matrix factorization process in accordance with one or more embodiments described herein.

FIG. 11 illustrates a flow diagram of another example, non-limiting computer-implemented method 1100 for performing a matrix factorization process in accordance with one or more embodiments described herein. The computer-implemented method 1100 can include block 1102, block 1104, block 1106, and block 1108. Repetitive description of like elements employed in other embodiments described herein is omitted for sake of brevity.

The computer-implemented method 1100 can comprise staging user features of the data matrix into a shared memory space in batches, at block 1102 (e.g., via the graphics processing unit 102). For example, the staging of user features can be based on the staging shown in FIG. 7A.

The computer-implemented method 1100 can also comprise calculating an outer product of two tiles in the user feature, at block 1104 (e.g., via the graphics processing unit 102). For example, calculation of the outer product is illustrated in FIG. 7A and FIG. 7B.

The computer-implemented method 1100 can also comprise aggregating the result of the outer product into a memory register, at block 1106 (e.g., via the graphics processing unit 102). For example, aggregating the result is shown in FIG. 7A.

The computer-implemented method 1100 can also comprise flushing the memory register into global memory based on the aggregating, at block 1108 (e.g., via the graphics processing unit 102 and/or the central processing unit 106). For example, flushing the memory register into global memory is illustrated in FIG. 7A and FIG. 7B.

According to at least one embodiment, the flushing the memory register can comprise flushing the memory register responsive to aggregating the outer product based on all user features of the data matrix. The flushing can therefore be based on complete aggregation of all non-void user features of the data matrix 108.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least performing a matrix factorization process and generation of an update to a data matrix are established from a combination of electrical and mechanical components and circuitry, a human is unable to replicate or perform processing performed by a central processing unit (e.g., the central processing unit 106) and/or graphic processing unit(s) (e.g., the graphics processing unit 102) disclosed herein. For example, a human is unable to communicate data and/or packetized data associated with a matrix factorization process and/or a machine learning model between a central processing unit e.g., the central processing unit 106) and/or graphic processing unit(s) (e.g., the graphics processing unit 102).

Figure 12:
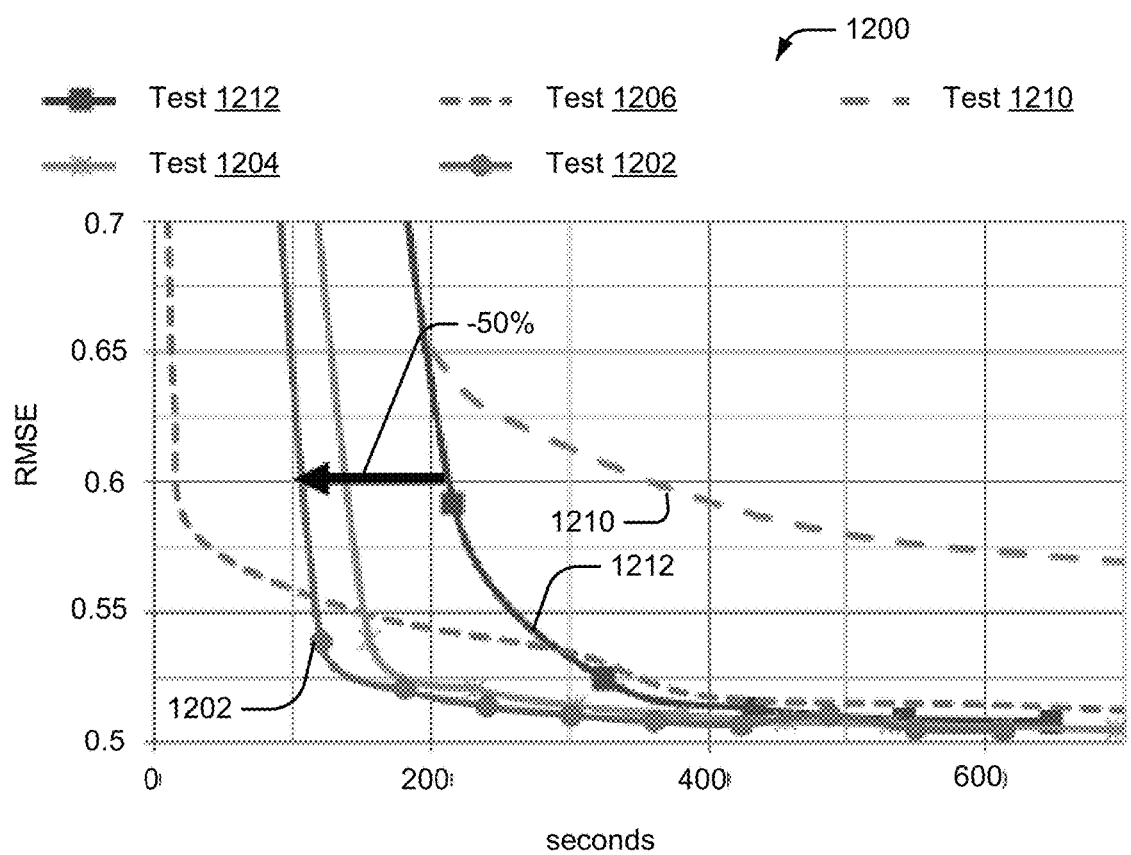
FIG. 12 illustrates a graph of processing time and error for an example, non-limiting matrix factorization process in accordance with one or more embodiments described herein.

FIG. 12 illustrates a graph 1200 of processing time and error for another example, non-limiting matrix factorization process in accordance with one or more embodiments described herein. An x-axis of the graph 1200 depicts an amount of time in seconds. A y-axis of the graph 1200 depicts root mean square error (RMSE). As shown in FIG. 12, a novel matrix factorization process 1202 associated with novel systems and computer-implemented methods disclosed herein (e.g., the system 100, the system 200, the computer-implemented method 1000 and/or the computer-implemented method 1100) can be performed in a shorter amount of time than a conventional matrix factorization process 1210 and 1212 associated with a conventional system. For example, the novel matrix factorization process 1202 can be completed and/or can achieve a particular degree of error in approximately 50% less time than either conventional processes 1210 and 1212. The novel matrix factorization process 1202 can be, for example, a matrix factorization process associated with a ratings system for rating media content such as movies, songs, videos, and other media content.

Figure 13:
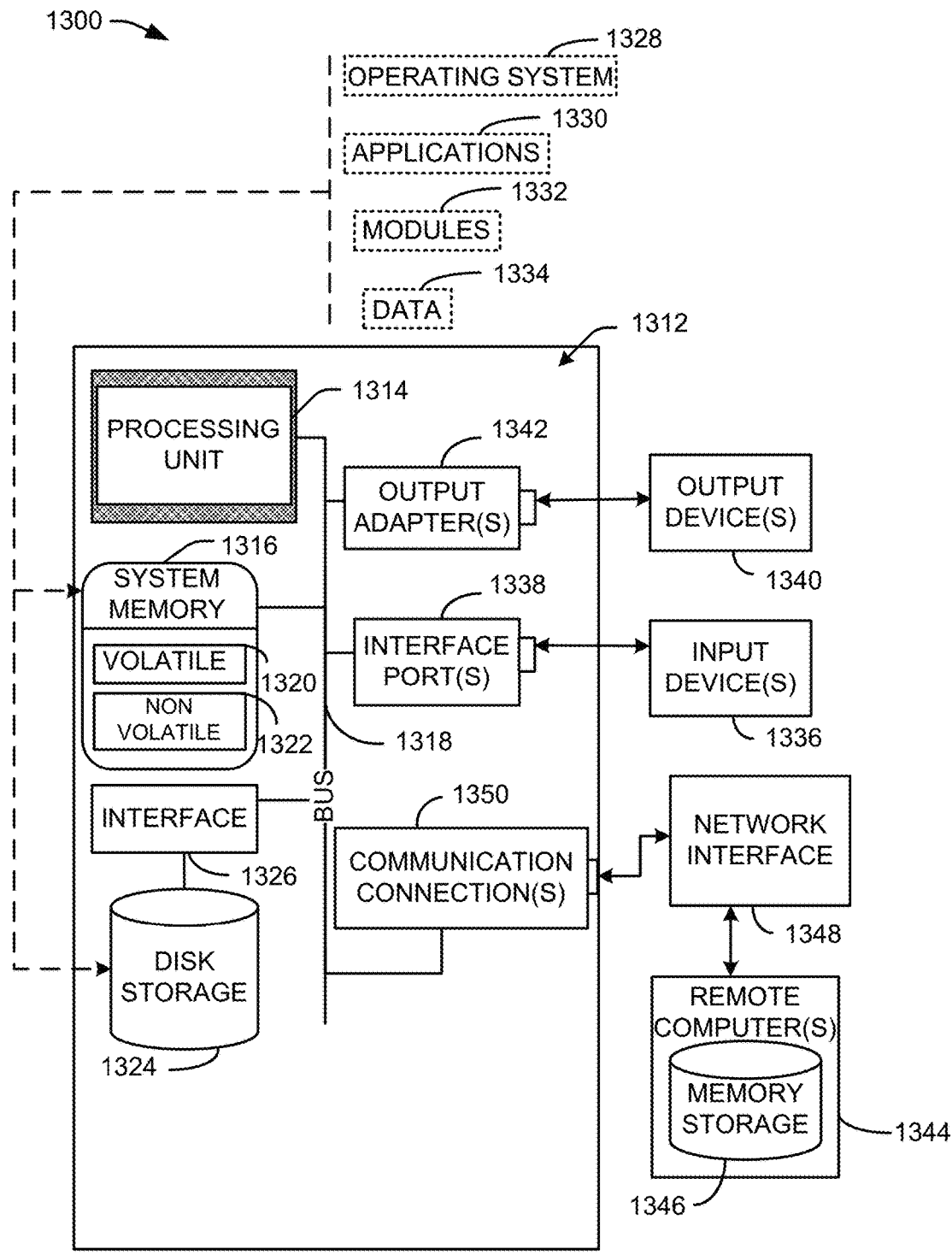
FIG. 13 illustrates a block diagram of an example, non-limiting operating environment in which one or more embodiments described herein can be facilitated.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity.

With reference to FIG. 13, a suitable operating environment 1300 for implementing various aspects of this disclosure can also include a computer 1312. The computer 1312 can also include a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314. The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1316 can also include volatile memory 1320 and nonvolatile memory 1322. The basic input/output system (BIOS), containing the basic routines to transfer information between elements within the computer 1312, such as during start-up, is stored in nonvolatile memory 1322. Computer 1312 can also include removable/non-removable, volatile/non-volatile computer storage media. FIG. 13 illustrates, for example, a disk storage 1324. Disk storage 1324 can also include, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media. To facilitate connection of the disk storage 1324 to the system bus 1318, a removable or non-removable interface is typically used, such as interface 1326. FIG. 13 also depicts software that acts as an intermediary between users and the basic computer resources described in the suitable operating environment 1300. Such software can also include, for example, an operating system 1328. Operating system 1328, which can be stored on disk storage 1324, acts to control and allocate resources of the computer 1312.

System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems. A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port can be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a computer, a server, a router, a network PC, a workstation, a microprocessor based appliance, a peer device or other common network node and the like, and typically can also include many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1350 refers to the hardware/software employed to connect the network interface 1348 to the system bus 1318. While communication connection 1350 is shown for illustrative clarity inside computer 1312, it can also be external to computer 1312. The hardware/software for connection to the network interface 1348 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product facilitating matrix factorization comprising a computer readable storage medium having program instructions embodied therewith, the program instructions executable by a graphics processing unit operatively coupled to a processor and causing the graphics processing unit to:

load item features from a data matrix into a shared memory, the data matrix being a matrix based on one or more user features and item features;

tile and aggregate outer products of data matrix tiles to generate an aggregate value, wherein the tiling and an aggregating comprises causing the graphics processing unit to:

calculate an outer product of two of the data matrix tiles in a user feature of the data matrix, wherein the user feature is comprised within the one or more user features;

aggregate a result of the outer product into a memory register to generate the aggregate value; and flush the memory register into global memory based on the aggregating; and approximate an update to the user feature of the data matrix based on the aggregate value and the loaded item features.

2. The computer program product of claim 1, wherein the program instructions further cause the graphics processing unit to:

scale a reduced precision set of variables associated with the data matrix into associated ones of the data matrix tiles.

3. The computer program product of claim 2, wherein the reduced precision set comprises storage reduced by fifty percent compared to full precision.

4. The computer program product of claim 2, wherein the reduced precision set comprises precision reduced from 32-bit precision to 16-bit precision.

5. The computer program product of claim 2, wherein the scaling the reduced precision set of variables comprises normalizing the reduced precision set of variables.

6. The computer program product of claim 5, wherein the normalizing the reduced precision set of the variables comprises determining a variable as a function of a mean value and a standard deviation value.

7. The computer program product of claim 1, wherein the loading the item features comprises loading an item feature of the data matrix via a cache into a shared portion of memory separate from other item features of the data matrix.

8. The computer program product of claim 1, wherein the tiling and aggregating comprises causing the graphics processing unit to:

stage the one or more user features of the data matrix into a shared memory space in batches.

9. A system, comprising:
a memory that stores computer executable components;
a processor operatively coupled to the memory; and
a graphics processing unit operatively coupled to the processor that executes the computer executable components stored in the memory, wherein the computer executable components comprise:
an approximate solver component that:
loads item features from a data matrix into a shared memory, the data matrix being a matrix based on one or more user features and item features;
tiles and aggregates outer products of data matrix tiles to generate an aggregate value, wherein tiling and aggregating comprises:
calculating an outer product of two of the data matrix tiles in a user feature of the one or more user features;
aggregating a result of the outer product into a memory register to generate the aggregate value; and
flushing the memory register into global memory based on the aggregating; and
approximates an update to the user feature of the data matrix based on the aggregate value and the loaded item features.

10. The system of claim 9, wherein the approximate solver further scales a reduced precision set of variables associated with the data matrix into associated ones of the data matrix tiles.

* * * * *